3,702,793
GELLED LIQUID PROPELLANT OXIDIZERS OF INTERHALOGEN COMPOUNDS
Henry P. Beltramini, South Sudbury, and James W. Dale, Winchester, Mass., assignors to Monsanto Research Corporation, St. Louis, Mo.
No Drawing. Filed Feb. 25, 1964, Ser. No. 347,995
Int. Cl. C06b 15/00; C06d 5/06
U.S. Cl. 149—1                           16 Claims This invention relates to a method of making gels, and more particularly, provides a novel method of making a gelled propellant oxidizer, novel gels produced by the said method, and a new chemical compound useful in making gels and its preparation.

Handling highly reactive materials such as rocket propellants in liquid form involves hazards which make it desirable to convert these materials to a solid gel. For example, the sloshing of liquids in rocket vehicles is a major problem in maintaining control and stability of the vehicles. Spillage is another problem with freely spreading, oxidizing and corrosive liquids, where a gel would be more desirable.

To provide gels useful for propellant use, it is desirable that the gel be as stable to the effects of temperature and shock as the propellant itself. The gel must also have a good shelf life, and must withstand stresses such as supergravity without disintegrating to form separate phases. The gelled propellant should also be thixotropic, that is, behave as a liquid under shear, for efficient pumping and metering. Still another requirement is that gel formation be achieved at a low concentration of gelling agent, below 10%, say, in order to avoid undue dilution of the active principle, and thus minimize effect on the specific impulse.

It is an object of this invention to provide a novel method of gelling a liquid propellant oxidizer.

Another object is to provide a novel, rigid, thixotropic propellant oxidizer gel.

Still another object is to provide a novel compound useful in preparing a propellant gel, and a method of preparation of said compound.

These and other objects will become evident upon consideration of the following specification and claims.

It has now been found that liquid chlorine/fluorine interhalogen compounds such as chlorine trifluoride and chlorine trifluoride/chlorine pentafluoride mixtures can be gelled by combination with a barium complex fluoride selected from $Ba(SbF_6)_2$ and $Ba(BiF_6)_2$.

The presently provided gels are excellently suited for use as propellant oxidizers. Chlorine trifluoride and chloride pentafluoride are well-established liquid propellant oxidizers, which produce a high specific impulse. The gellant materials of the present invention are inert in the medium of these oxidizers, and the gel is as stable to the effects of temperature and shock as the oxidizer itself. Rigid gels are formed with only low percentages of gelling agent, and thus propellants using these gels as oxidizers have a high specific impulse. The gels are storage-stable and withstand stresses such as supergravity without significant syneresis. Moreover, the gels are thixotropic, and thus conveniently handled for efficient pumping and metering.

The effectiveness of the stated barium complex salts as gellants for the chlorine/flourine interhalogen compounds is unique. Numbers of other metallic fluoride compounds, including, for example, such closely related salts as $Ba(AsF_6)_2$, have been screened for gelling activity in these oxidizers, but none were found to possess such activity.

The compound $Ba(BiF_6)_2$ is a novel compound which has not been described in the literature hitherto, and its provision is a further object of the present invention. It can be produced, it has been found, by the reaction of $BaF_2$ with $BiF_5$ in anhydrous HF. It can also be synthesized by the reaction of $BaF_2$ with $ClF_2BiF_6$ in solution in a chlorine/fluorine interhalogen compound such as $ClF_3$, in which case stirring to disperse the resulting complex barium fluoride in the liquid interhalogen compound produces a gel in accordance with the present invention. If desired, the resulting gel can be warmed to volatilize the interhalogen compound, leaving the barium hexafluorobismuthate as a residue.

Barium hexafluorobismuthate is a stable solid, which is useful for a variety of industrial and agricultural purposes. It may be employed, for example, to provide gels in accordance with the present invention. It may also be used as a fluorinating agent, to introduce fluorine into organic compounds such as cyclohexanes and the like; as a fluorine-supplying constituent of glasses, ceramics, enamels or the like; as a dissociable conductive solute in an HF electrolyte, and so forth. Additionally, this novel compound may be used as a biological toxicant, in formulated insecticides, fungicides, bactericides, nematocides, herbicides or the like.

In the practice of the present invention for the preparation of oxidizing propellant gels, a liquid chlorine/fluorine interhalogen compound is combined with a gelling agent selected from $Ba(SbF_6)_2$ and $Ba(BiF_6)_2$.

The chlorine/fluorine interhalogen compounds which can usefully be converted to gels in accordance with the present invention include $ClF_3$ and $ClF_3/ClF_5$ mixtures. Chlorine trifluoride is liquid below 11° C. It is miscible with $ClF_5$ and its mixtures with this oxidizer, in weight ratios up to about 90:10 $ClF_5:ClF_3$, are generally liquid at −20° C. and below. The liquid oxidizers gelled as provided by this invention may be combinations of $ClF_3$ with from 0 to 90% by weight (of the total) $ClF_5$. Where $ClF_5/ClF_3$ mixtures are gelled, a ratio of $ClF_5:ClF_3$ ranging up to about 75:25 is especially preferred.

The chlorine/fluorine interhalogen oxidizers used for gel formation in accordance with this invention may, if desired, be admixed with inert diluents, although generally there is no advantage to be gained thereby. The oxidizer will be anhydrous; and further, $ClF_3$, at least, should be free of HF. In $ClF_3$, low percentages of HF, such as 1–3% of the total weight, it has been found, may prevent gel formation, and will detract from the rigidity and stability of gels which are formed. In $ClF_3/ClF_5$ mixtures, it is desirable to use HF-free materials for gel formation, also, although it has been found that gel formation will take place with the present gelling agents even in the presence of substantial amounts of HF.

The gelling agents may be combined with the chlorine/fluorine interhalogen compounds either by adding the preformed complex salts to the liquid interhalogen compounds, or by forming the $Ba(SbF_6)_2$ or $Ba(BiF_6)_2$ in the medium of the interhalogen compound.

Formation of the gelling agent in the medium of the interhalogen compound can be effected advantageously, it has been discovered, by adding $BaF_2$ to a solution of $ClF_2MF_6$ (where M=Sb or Bi) in the interhalogen compound. The reaction proceeds in accordance with the equation $$BaF_2 + 2ClF_2MF_6 \rightarrow 2ClF_3 + Ba(MF_6)_2$$

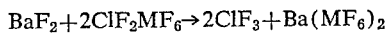

liberating $ClF_3$ as a byproduct. Thus, byproduct of the reaction is an energetic oxidizer component of the reaction mixture, and introduction of an extraneous, unreactive gel component is avoided. This mode of preparation of the gelling agent also has the further advantage that generally it produces more rigid gels than separate synthesis of the barium salt followed by its addition to the liquid interhalogen compound.

The concentration of barium salt gelling agent in the presently provided gels, calculated on the total weight of liquid gelled plus gelling agents, will generally be in the range of from 2% to 10%. Quite rigid gels are produced using a concentration of barium complex gelling agent equal to at least about 3% by weight of the total of liquid gelled plus gelling agent, and gels containing at least 3% of the gelling agent are preferred. Usually rocket propellant oxidizer gels are disadvantageously lowered in specific impulse when the gelling agent concentration is above 10% by weight of the total. However, gels having all the desired characteristics for oxidizer use in accordance with the present invention are generally obtained at concentrations well below this. Indeed, the rigidity of the gel may become excessive at barium salt concentrations approaching 10% by weight, and the range of 3–6% by weight of the total is especially preferred.

References to gelling agent or barium salt concentrations herein are to be understood to refer to the total weight of barium salt selected from $Ba(BiF_6)_2$, $Ba(SbF_6)_2$, and mixtures of the same. It has been found that the stated barium salts are effective gellants for the chlorine/fluorine liquid interhalogen compounds either individually or in combination.

Combination of the barium salt gellant with the chlorine/fluorine interhalogen oxidizer will be effected, either by addition of the performed salt to the oxidizer or by formation of it in the medium of the oxidizer, at temperatures at which the chlorine/fluorine interhalogen oxidizer is liquid. Useful temperatures for this purpose will vary, depending on the ambient pressures. These may be super-atmospheric pressures such as to maintain the interhalogen compounds in the liquid state at temperatures as high as 75 or 100° C., for example. Sub-atmospheric pressures may also be used where any advantage is to be gained thereby. However, approximately atmospheric pressures will generally be the most convenient conditions for gel formation, and in this case, the temperatures employed in gel formation, to maintain the interhalogen compounds in the liquid state, will generally be from about 0° C. to about −25° C. At temperatures as low as about −100° C., the interhalogen compounds will solidify. Usually it will be convenient to form the gels at temperatures substantially above this, such as above −50° C. As the temperature of gel formation is decreased, generally gel formation becomes slower and the gel structure formed becomes more rigid: for convenient gel formation rates combined with production of particularly useful gels, generally temperatures of about −25° to about −15° C. have been found especially desirable.

The invention is illustrated but not limited by the following examples.

EXAMPLE 1

This example describes the preparation of barium hexafluorobismuthate.

To prepare barium hexafluorobismuthate, 5.0 grams (g) of barium difluoride is dissolved in 100 g. of anhydrous HF in a polytetrafluoroethylene container at 0° C., and 17.4 g. of bismuth pentafluoride is slowly added to this solution. The mixture, maintained at 0° C. and under a nitrogen sweep to exclude moisture, is stirred for one hour. Then the reactor is warmed slowly to room temperature, driving off the HF. The weight gain of the solid product indicates a 100% conversion to barium hexafluorobismuthate.

EXAMPLE 2

This example describes preparation of gels of $ClF_3$ with $Ba(SbF_6)_2$.

(A) To a solution of 1.3 g. of $ClF_2SbF_6$ in 20 g. of chlorine trifluoride, in a glass test tube cooled to 0° C., is added 0.37 g. of $BaF_2$. This amount of $BaF_2$ and $ClF_2SbF_6$ is sufficient to provide 5.9% by weight of barium hexafluoroantimonate, calculated on the total weight of the mixture. The reaction mixture is covered, to exclude atmospheric moisture, and stirred while it is maintained at 0° C. Gelation occurs within a few minutes after addition of the $BaF_2$.

The procedure described in the preceding paragraph is repeated, except that the 20 g. of $ClF_3$ containing 1.3 g. of $ClF_2SbF_6$ is maintained at −23° C. while the $BaF_2$ is added. Gelation also occurs, though more slowly than at 0° C.

(B) The procedure of paragraph A is repeated, but adding 0.43 g. of $BaF_2$ to a solution of 1.52 g. of $ClF_2SbF_6$ in 20 g. of $ClF_3$ at 0° C. On stirring, the mixture forms a gel, with a content of 1.50 g. of barium hexafluoroantimonate, which is a 6.8% concentration.

(C) The procedure of paragraph A is repeated, but adding 0.50 g. of $BaF_2$ to a solution of 1.77 g. of $ClF_2SbF_6$ in 20 g. of $ClF_3$ at 0° C., which is calculated to provide 1.74 g. of barium hexafluoroantimonate, a 7.8% concentration. Again, a rigid gel is formed.

When the $ClF_3$ is evaporated off, under a stream of dry nitrogen, from the gels prepared as described in paragraphs A, B and C above, and the remaining solid is mixed with water, reactivity with water is negligible, indicating that the metathesis is complete and all that remains is the metal hexafluoroantimonate. (Unreacted $ClF_2SbF_6$ will react explosively with water.)

When 20 g. of $ClF_3$ is added to the anhydrous residues and the mixtures are stirred, rigid gels are again formed.

EXAMPLE 3

This example describes preparation of a $ClF_3$ gel with $Ba(BiF_6)_2$.

To prepare $ClF_2BiF_6$, 50 g. of $BiF_5$ is added to a large excess of $ClF_3$ in a tetrafluoroethylene polymer reactor maintained at −23° C. The mixture is stirred for several hours and the reactor is warmed to room temperature to drive off excess $ClF_3$. The product is crushed and swept for several hours with dry nitrogen. The weight of product obtained represents better than a 98% yield. Analysis of a sample shows a fluorine and chlorine content agreeing with the calculated.

A solution of 1.29 $ClF_2BiF_6$ in $ClF_3$ is maintained at 0° C. while 0.28 g. barium difluoride is added, the amounts of $BaF_2$ and $ClF_2BiF_6$ being calculated to provide 1.28 g. of barium hexafluorobismuthate, which is 6% of the weight of the 20 g. of $ClF_3$ present initially. Upon moderate stirring, gelation occurs rapidly. The gel formed is stiff and rigid.

The $ClF_3$ is evaporated from the gel under dry nitrogen and fresh $ClF_3$ is added to the residue. The mixture rapidly re-gels on stirring.

EXAMPLE 4

This example describes preparation of gels using separately prepared gellants.

Barium hexafluorobismuthate is prepared as described in Example 1. Barium hexafluoroantimonate is prepared similarly, by reaction of $BaF_2$ with $SbF_5$ in HF. 1.28 g. of each of these barium complex fluorides is added to separate 20 g. portions of HF-free $ClF_3$ at 0° C., and the mixture is stirred. In each case, rigid gels are formed, which are as homogeneous as the gels prepared by formation of the complex salt in the oxidizer, but somewhat less stiff.

EXAMPLE 5

This example illustrates preparation of gels with a mixture of $Ba(SbF_6)_2$ and $Ba(BiF_6)_2$.

To a solution of 0.68 g. of $ClF_2SbF_6$ and 0.62 g. of $ClF_2BiF_6$ in 20 g. of $ClF_3$ is added 0.32 g. of $BaF_2$, at −20° C., to provide a concentration of 3% each of $Ba(SbF_6)_2$ and of $Ba(BiF_6)_2$ in the $ClF_3$ oxidizer. Upon stirring, the mixture forms a rigid gel.

EXAMPLE 6

This example illustrates preparation of gels from $ClF_3/ClF_5$ mixtures.

Mixtures of $ClF_3$ with $ClF_5$ are prepared in which the ratio of $ClF_3$ to $ClF_5$ is 75:25 by weight, in a first mixture, and 50:50 by weight, in a second mixture. The $ClF_5$ employed to prepare these mixtures contains 3–5% HF. $ClF_2SbF_6$, in the amount of 1.3 g., is dissolved in 20 g. samples of each of the stated mixtures, and then 0.37 g. of $BaF_2$ is added to each solution, and the resulting reaction mixture is stirred. In each case, a rigid gel is formed.

EXAMPLE 7

This example illustrates the criticality of HF content for gel formation in $ClF_3$.

A stock solution of 3% by weight HF in $ClF_3$ is made by first scrubbing commercial $ClF_3$ over sodium fluoride to remove any HF impurity and then adding enough anhydrous HF to make up the 3% stock solution. Concurrently, scrubbed $ClF_3$ is prepared, free of HF.

Barium difluoride is added to solutions of $ClF_2SbF_6$ and of $ClF_2BiF_6$ in $ClF_3$ at 0° C. in amounts as indicated below, and the mixtures are stirred and observed.

| $BaF_2$ (g.) | $ClF_2SbF_6$ (g.) | HF-free $ClF_3$ (g.) | 3% HF/ $ClF_3$ (g.) |
|---|---|---|---|
| 0.37 | 1.30 | 20 | |
| 0.37 | 1.30 | | 20 |
| 0.50 | 1.77 | 20 | |
| 0.50 | 1.77 | | 20 |
| 0.28 | 1.29 | 20 | |
| 0.28 | 1.29 | | 20 |

In each case, no gel is formed in the 3% $HF/ClF_3$ mixture, whereas a rigid gel is formed in the reaction mixtures made with scrubbed, HF-free $ClF_3$.

EXAMPLE 8

This example illustrates the effect of temperature of preparation on gel properties.

Gels are prepared by adding $BaF_2$ to separate solutions of $ClF_2SbF_6$ and $ClF_2BiF_6$, respectively, in $ClF_3$, in amounts calculated to provide 1.28 g. of $Ba(SbF_6)_2$ and of $Ba(BiF_6)_2$ to 20 g. of $ClF_3$ initially present, at temperatures of 0°, —10° and —20° C. The homogeneity of the gels prepared at —20° C. is greater than that of those prepared at 0° C.; that of the —10° C. preparations is intermediate in homogeneity. All are rigid gels.

EXAMPLE 9

This example describes thixotropic behavior of the gels of the invention.

Gels are formed by adding $BaF_2$ to solutions of $ClF_2SbF_6$ and $ClF_2BiF_6$, respectively, in $ClF_3$ at —20°, in amounts providing 6% concentrations of $Ba(SbF_6)_2$ and $Ba(BiF_6)_2$. The resulting gels are allowed to warm to 0° C. and the flasks in which they are formed are shaken with a rotary motion at this temperature. The barium hexafluorobismuthate gel moves as a solid mass. The barium hexafluoroantimonate gel liquifies and swirls around the walls of the flask. On cessation of motion, it resets almost immediately.

EXAMPLE 10

This example illustrates viscosity properties of gels according to the invention.

Gels are prepared by combining barium hexafluoroantimonate and barium hexafluorobismuthate with chlorine trifluoride. The same proportions are used as in the examples described above, but the samples are prepared on an increased scale, using 30 g. of $ClF_3$. Viscosity measurements are made on the gels with a Brookfield LVF viscometer, using a number 4 spindle. The following tables present the result of these measurements.

TABLE 1.—VISCOSITY OF $Ba(SbF_6)_2$ GELS

| Gel type | Temp., °C. | Viscosity, centipoises, at spindle speed of— | | | |
|---|---|---|---|---|---|
| | | 6 r.p.m. | 12 r.p.m. | 30 r.p.m. | 60 r.p.m |
| 6% perpared in $ClF_3$ | 0 | 29,500 | 14,000 | 7,600 | 3,960 |
| | —10 | 30,200 | 14,950 | 8,080 | 4,730 |
| | —20 | 38,100 | 21,200 | 10,840 | 6,380 |
| 6% previously prepared | 0 | 280 | 780 | 1,600 | 3,800 |
| | —10 | 600 | 1,380 | 2,850 | 5,200 |
| | —20 | 770 | 2,100 | 3,550 | 6,800 |
| 5% prepared in $ClF_3$ | 0 | 12,000 | 8,800 | 3,780 | 1,990 |
| | —10 | 15,800 | 8,800 | 4,260 | 2,400 |
| | —20 | 14,000 | 8,100 | 4,280 | 2,400 |

TABLE 2.—VISCOSITY OF $Ba(BiF_6)_2$ GELS

| Gel type | Temp., °C. | Viscosity, centipoises, at spindle speed of— | | | |
|---|---|---|---|---|---|
| | | 6 r.p.m. | 12 r.p.m. | 30 r.p.m. | 60 r.p.m |
| 6% prepared in $ClF_3$ | 0 | 13,200 | 7,500 | 4,080 | 2,440 |
| | —10 | 11,500 | 5,900 | 3,680 | 2,400 |
| | —20 | 12,200 | 5,700 | 3,500 | 2,500 |
| 6% previously prepared | 0 | 1,000 | 400 | (¹) | (¹) |
| | —10 | 5,600 | 2,300 | 520 | 40 |
| | —20 | 4,000 | 2,100 | 1,500 | 460 |

¹ Off scale.

Gels are prepared by forming barium hexafluoroantimonate and barium hexafluorobismuthate respectively in chlorine trifluoride, at concentrations ranging from 2.75% to 6%, using 30 gram samples of chlorine trifluoride. Whereas the previous gels used for viscosity measurements are prepared by stirring with a flat-bladed mechanical stirrer, in this case a magnetic stirring bar is used. A Brookfield LVF viscometer is used with a number 4 spindle. The apparent viscosity of all the gels is more than 100,000 centipoises at a spindle speed of 6 r.p.m. and more than 10,000 at a spindle speed of 60 r.p.m.

EXAMPLE 11

This example illustrates the resistance of the gels of the invention to separation.

Gels containing respectively 5% and 6% of barium hexafluoroantimonate and barium hexafluorobismuthate are prepared by addition of barium fluoride to $ClF_3$ solutions of $ClF_2SbF_6$ and $ClF_2BiF_6$, respectively, at —20° C. The resulting gels, formed after brief stirring, are placed in a centrifuge at a temperature of —20° C. The motor rotation speed is measured by direct stroboscopic measurement and the r.p.m. readings are converted to gravity (g) forces. The antimonate gels are unchanged by forces of 200–300 g's. The bismuthate gels undergo some liquid extrusion after centrifuging for 30–60 minutes.

Gels of $ClF_3$ containing respectively 6% of barium hexafluoroantimonate and barium hexafluorobismuthate are prepared at —20° C. by preparation of the gellant in the oxidizer. The resulting gels are vibrated in a laboratory shaker at 100 cycles per second for 3 hours, and then at 200 cycles per second for an additional 2 hours. The gels remain entirely stable, without exhibiting any liquid separation or other degeneration. Neither are any deleterious effects such as syneresis evident when gels of the same composition are vibrated in a laboratory shaker at a rate of 200 vibrations per minute at —20° C. for 12 hours.

EXAMPLE 12

This example illustrates high temperature stability of the present gels.

Gels prepared by combining 6% barium hexafluoroantimonate and barium hexafluorobismuthate with chlorine trifluoride are exposed to temperatures of 95° C. for 100 hours in sealed black iron tubes. The amount of free space above the gels is approximately 80% of the total volume. When the tubes are cooled and opened, each tube contains an amount of liquid chlorine trifluoride, about 13% of the gel volume, which is approximately equivalent to the amount required to reach the vapor pressure of $ClF_3$ at 95° C. in the void above the gel in the tube. The remainder of the contents of the tube in each case is a rigid gel.

EXAMPLE 13

This example illustrates storage stability of the present gels.

6% barium hexafluoroantimonate and barium hexafluorobismuthate gels prepared both by formation of the gellant in $ClF_3$ and by addition of the preformed gellant to the chlorine trifluoride are made, using magnetic stirring bars for initial agitation, in glass tubes. The tubes in which the gels are prepared are sealed under nitrogen and stored upside down at −20° C. The gels remain intact and still support the magnetic stirring bars after 3 weeks. Syneresis over this period of storage produces only a minute amount of liquid.

Gels are prepared with 6% concentrations of $Ba(SbF_6)_2$ and $Ba(BiF_6)_2$ by formation in the oxidizer and by addition of the preformed gellant to the $ClF_3$, using mechanical stirrers, in Kel-F and black iron containers. The gels are stored at −20° C.; for about 4 days, their temperature is allowed to rise to 25–30° C., and they are then brought down to −20° C. and storage is continued. After 3 months, the gels are still rigid and no appreciable syneresis has occurred.

While the invention has been described with reference to various specific preferred embodiments thereof, it is to be appreciated that modifications and variations can be made without departing from the scope of the invention, which is limited only as defined in the appended claims.

What is claimed is:

1. The method of gelling a propellant oxidizer which comprises combining (1) a liquid chlorine/fluorine interhalogen compound oxidizer selected from the class consisting of $ClF_3$ and mixtures of $ClF_3$ with $ClF_5$, with (2) a gellant selected from the class consisting of $Ba(BiF_6)_2$, $Ba(SbF_6)_2$ and mixtures of $Ba(SbF_6)_2$ and $Ba(BiF_6)_2$.

2. The method of claim 1 in which said gelling is effected by preparation of said gellant in the medium of said interhalogen compound, by addition of $BaF_2$ to a solution of a salt selected from the group consisting of $ClF_2SbF_6$, $ClF_2BiF_6$, and mixtures of $ClF_2SbF_6$ with $ClF_2BiF_6$ in said interhalogen oxidizer.

3. The method of claim 1 in which said gelling is effected by addition of a preformed salt selected from the class consisting of $Ba(BiF_6)_2$, $Ba(SbF_6)_2$ and mixtures of $Ba(BiF_6)_2$ with $Ba(SbF_6)_2$ to said interhalogen oxidizer.

4. The method of gelling a mixture of $ClF_3$ and $ClF_5$ which comprises adding $BaF_2$ to a solution of a salt selected from the class consisting of $ClF_2SbF_6$, $ClF_2BiF_6$ and mixtures of $ClF_2SbF_6$ with $ClF_2BiF_6$, in a liquid mixture of $ClF_3$ with $ClF_5$ in which the ratio of $ClF_5$ to $ClF_3$ is up to 90:10, by weight.

5. The method of gelling $ClF_3$ which comprises adding $BaF_2$ to a solution of a salt selected from the class consisting of $ClF_2SbF_6$, $ClF_2BiF_6$ and mixtures of $ClF_2SbF_6$ with $ClF_2BiF_6$, in liquid $ClF_3$ substantially free of HF.

6. The method of gelling $ClF_3$ which comprises adding $BaF_2$ to $ClF_2SbF_6$ dissolved in liquid, substantially HF-free $ClF_3$, in amounts calculated to provide between 2% and 10% of $Ba(SbF_6)_2$, by reaction of said $BaF_2$ and $ClF_2SbF_6$, calculated on the total weight of the resulting mixture.

7. The method of producing $Ba(BiF_6)_2$ which comprises adding $BaF_2$ to $ClF_2BiF_6$ dissolved in $ClF_3$.

8. A gelled propellant oxidizer comprising the combination of a chlorine/fluorine interhalogen compound oxidizer selected from the class consisting of $ClF_3$ and mixtures of $ClF_3$ with $ClF_5$, with a gellant selected from the class consisting of $Ba(SbF_6)_2$, $Ba(BiF_6)_2$ and mixtures of $Ba(SbF_6)_2$ and $Ba(BiF_6)_2$.

9. A gelled propellant oxidizer comprising the combination of $ClF_3$ substantially free of HF with a gellant selected from the class consisting of $Ba(SbF_6)_2$, $Ba(BiF_6)_2$ and mixtures of $Ba(SbF_6)_2$ with $Ba(BiF_6)_2$.

10. A gelled propellant oxidizer comprising the combination of an oxidizer consisting essentially of a mixture of $ClF_3$ with $ClF_5$ in which the ratio of $ClF_5$ to $ClF_3$ is up to about 90:10 by weight, with a gellant selected from the class consisting of $Ba(SbF_6)_2$, $Ba(BiF_6)_2$ and mixtures of $Ba(SbF_6)_2$ with $Ba(BiF_6)_2$.

11. A gelled propellant oxidizer comprising the combination of $ClF_3$ substantially free of HF with a gellant consisting essentially of $Ba(SbF_6)_2$.

12. A gelled propellant oxidizer comprising the combination of $ClF_3$ substantially free of HF with a gellant consisting essentially of $Ba(BiF_6)_2$.

13. The combination of $ClF_3$ substantially free of HF with from 2 to 10% of $Ba(SbF_6)_2$, by weight of the total mixture.

14. The combination of $ClF_3$ substantially free of HF with from 2 to 10% of $Ba(BiF_6)_2$, by weight of the total mixture.

15. The combination of a mixture of $ClF_5$ and $ClF_3$ in a ratio of $ClF_5:ClF_3$ up to about 90:10 by weight, with from 2 to 10% of $Ba(SbF_6)_2$, by weight of the total mixture.

16. The combination of a mixture of $ClF_5$ and $ClF_3$ in a ratio of $ClF_5$ to $ClF_3$ up to about 90:10 by weight, with from 2 to 10% of $Ba(BiF_6)_2$, by weight of the total mixture.

References Cited

UNITED STATES PATENTS 3,470,040    9/1969    Tarpley _____ 149—1

BENJAMIN R. PADGETT, Primary Examiner

U.S. Cl. X.R.

149—2, 109